(12) United States Patent
Sutherland

(10) Patent No.: US 10,682,598 B2
(45) Date of Patent: Jun. 16, 2020

(54) DEVICE FOR STORING A FUEL FILTER IN A VEHICLE AND METHOD

(71) Applicant: Brian Sutherland, Moab, UT (US)

(72) Inventor: Brian Sutherland, Moab, UT (US)

( * ) Notice: Subject to any disclaimer, the term of this patent is extended or adjusted under 35 U.S.C. 154(b) by 200 days.

(21) Appl. No.: 16/028,061

(22) Filed: Jul. 5, 2018

(65) Prior Publication Data

US 2019/0009198 A1     Jan. 10, 2019

Related U.S. Application Data

(60) Provisional application No. 62/528,959, filed on Jul. 5, 2017.

(51) Int. Cl.
*B01D 35/30*     (2006.01)

(52) U.S. Cl.
CPC ........ *B01D 35/306* (2013.01); *B01D 2201/40* (2013.01); *B01D 2201/4023* (2013.01)

(58) Field of Classification Search
CPC ........ B01D 2201/40; B01D 2201/4023; B01D 35/306
See application file for complete search history.

(56) References Cited

U.S. PATENT DOCUMENTS

| | | |
|---|---|---|
| 5,121,894 A | 6/1992 | Twork, Sr. et al. |
| 5,474,676 A | 12/1995 | Janik et al. |
| 5,702,599 A | 12/1997 | Brown et al. |
| 5,921,520 A | 7/1999 | Wisniewski |
| 8,343,345 B1 | 1/2013 | Perryman, Jr. |

*Primary Examiner* — Dirk R Bass
(74) *Attorney, Agent, or Firm* — Charles Runyan

(57) ABSTRACT

A device for storing a fuel filter in a vehicle includes a fuel filter couple and a support frame. The fuel filter couple includes a threaded male filter mount and a filter seal interface. The threaded male filter mount is configured to threadably couple with a threaded female filter mount of the fuel filter. The filter seal interface is configured to seal against a fuel filter seal of the fuel filter when the threaded male filter mount is tightened into the threaded female filter mount. The support frame extends from the fuel filter couple and includes a vehicle couple configured to mount the device to the vehicle. The device for storing a fuel filter in a vehicle is useful for sealing a fuel filter to prevent fuel leakage and storing the fuel filter in the vehicle.

18 Claims, 5 Drawing Sheets

DEVICE FOR STORING A FUEL FILTER IN A VEHICLE AND METHOD

CROSS-REFERENCE TO RELATED APPLICATION(S)

The present application is related to and claims priority to U.S. Provisional Patent Application No. 62/528,959 filed Jul. 5, 2017, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of vehicles of existing art and more specifically relates to accessories for fuel filters.

RELATED ART

A fuel filter screens out debris from the fuel found in vehicles. Fuel filters are found in most internal combustion engines. Unfiltered fuel may contain several kinds of contamination, which may cause damage to the engine. If these contaminants are not removed before the fuel enters the system, they will cause rapid wear and failure of the fuel pump and injectors, due to the abrasive action of the particles on the high-precision components used in modern injection systems. Fuel filters also improve performance, as fuel low in contaminants burns more efficiently.

Fuel filters need to be maintained at regular intervals. A worn-out filter is simply disconnected from the fuel line and replaced with a new filter. Long-distance drivers such as truck drivers who transport commercial goods and have tight distribution schedules to adhere to have limited time for vehicle maintenance while on the road. For quick and efficient replacement of a worn-out fuel filter, a driver needs one or more spare, pre-filled fuel filters stored inside the vehicle. Fuel filters are sold empty and without a cover. When a filter is installed in a vehicle at an auto shop, the filter is filled with fuel and connected to the fuel line in the vehicle. When a fuel filter is replaced once worn out, the filter typically contains residual fuel. It is not uncommon for used fuel filters to be discarded on the side of the road. A desirable alternative is for the driver to store the used filter in the vehicle and drop the filter off at a recycling location. A suitable solution is desired.

U.S. Pat. No. 8,343,345 to James A. Perryman, Jr. relates to a temporary closure for disposable fluid filters. The described temporary closure for disposable fluid filters includes a temporary closure designed for attachment at a fluid outlet of a fluid filter after the fluid filter is used and removed from a circuit of moving fluid in a machine. The temporary closure functions to substantially contain residual fluid within the filter housing prior to subsequent processing of the used fluid filter.

SUMMARY OF THE INVENTION

In view of the foregoing disadvantages inherent in the known accessories for fuel filters art, the present disclosure provides a novel device for storing a fuel filter in a vehicle and method. The general purpose of the present disclosure, which will be described subsequently in greater detail, is to provide a device for sealing a fuel filter to prevent fuel leakage and entry of debris, and for storing the fuel filter in the vehicle.

A device for storing a fuel filter in a vehicle is disclosed herein. The device for storing a fuel filter in a vehicle includes a fuel filter couple and a support frame. The fuel filter couple includes a threaded male filter mount and a filter seal interface. The threaded male filter mount is configured to threadably couple with a threaded female filter mount of the fuel filter. The filter seal interface is configured to seal against a fuel filter seal of the fuel filter when the threaded male filter mount is tightened into the threaded female filter mount. The support frame extends from the fuel filter couple and includes a vehicle couple configured to mount the device to the vehicle.

According to one embodiment, a method of storing a fuel filter in a vehicle is also disclosed herein. The method of storing a fuel filter in a vehicle includes a first step, providing a device for storing a fuel filter in a vehicle (as described above); and a second step, fastening the fuel filter to the device (by threadably coupling the threaded female filter mount of the fuel filter with the threaded male filter mount of the device).

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a novel device for storing a fuel filter in a vehicle and method, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to accessories for fuel filters and more particularly to a device for storing a fuel filter in a vehicle and method as used to improve the storing of a fuel filter in a vehicle.

Generally, the device for storing a fuel filter in a vehicle allows a vehicle driver to store a spare, pre-filled fuel filter inside the vehicle. The device serves dual purposes: it seals the fuel filter to prevent fuel leakage and entry of debris and can be used to secure the fuel filter inside the vehicle. The driver may attach the fuel filter to the device and fasten the device to a surface of the vehicle (e.g., the inside of the chassis, the installed fuel filter that is in use, or the fuel line). Alternatively, the driver may place the device with the fuel filter attached to it in a tool box or other container inside the vehicle.

Figure 1:
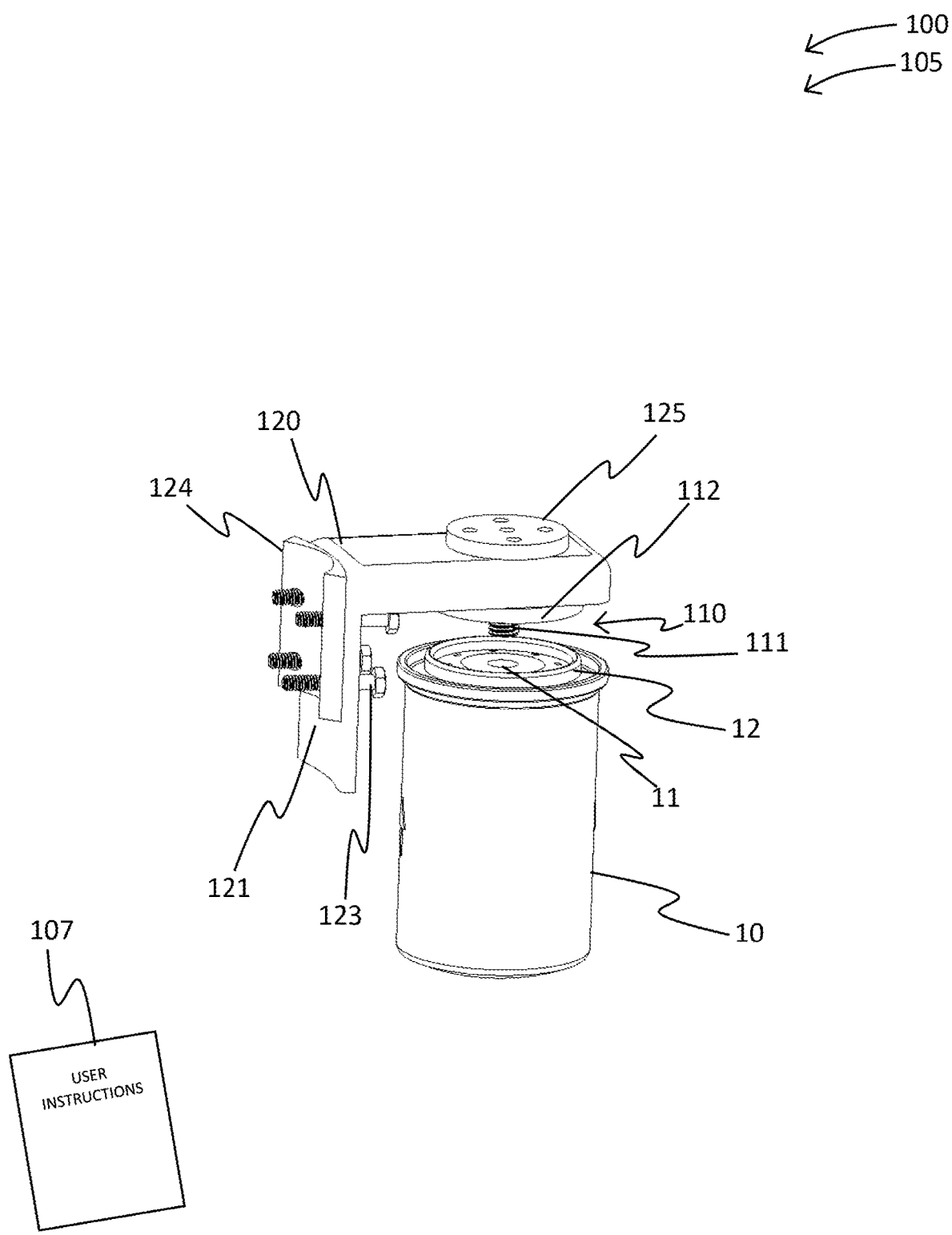
FIG. 1 is a perspective view of a device for storing a fuel filter in a vehicle, according to an embodiment of the disclosure.

Referring now more specifically to the drawings by numerals of reference, there is shown in FIGS. 1-4, various views of a device for storing a fuel filter in a vehicle. FIG. 1 shows a device 100 for storing a fuel filter in a vehicle, according to an embodiment of the present disclosure. As illustrated, the device for storing a fuel filter in a vehicle 100 may include a fuel filter couple 110 and a support frame 120.

The fuel filter couple 110 may include a threaded male filter mount 111 and a filter seal interface 112. The threaded male filter mount 111 may be configured to threadably couple with a threaded female filter mount 11 of the fuel filter 10. The filter seal interface 112 may be a pad made of rubber or other material suitable to create an airtight seal when the threaded male filter mount 111 is tightened into the threaded female filter mount 11 and the filter seal interface 112 pressed against a sealing ring 12 of the fuel filter 10.

The support frame 120 may include a mounting bracket 121, bolt holes 122 (FIG. 4) mounting bolts 123, and a mounting pad 124. The mounting pad 124 may be affixed to a surface of the mounting bracket 121 that faces a surface of the vehicle 40 (FIG. 4) the support frame 120 is fastened to. The mounting bolts 123 may run through the bolt holes 122, the mounting pad 124, and the vehicle bolt holes 41 (FIG. 4), to fasten the support frame 120 to the surface of the vehicle 40.

The mounting pad 124 may be made of rubber, or other material suitable to compress when the mounting bolts 123 fasten the support frame 120 to the surface of the vehicle 40. According to one embodiment the mounting pad 124 may be made of heat-resistant rubber, while the support frame 120 may be made of heat-resistant metal. The support frame 120 may further include a second mounting pad 125 affixed to the support frame and configured to face an additional surface of the vehicle that the support frame may be fastened to.

According to one embodiment, the device 100 may be arranged as a kit 105. In particular, the device 100 may further include a set of instructions 107. The instructions 107 may detail functional relationships in relation to the structure of the device for storing a fuel filter in a vehicle 100 such that the device for storing a fuel filter in a vehicle 100 can be used, maintained, or the like, in a preferred manner.

Figure 2:
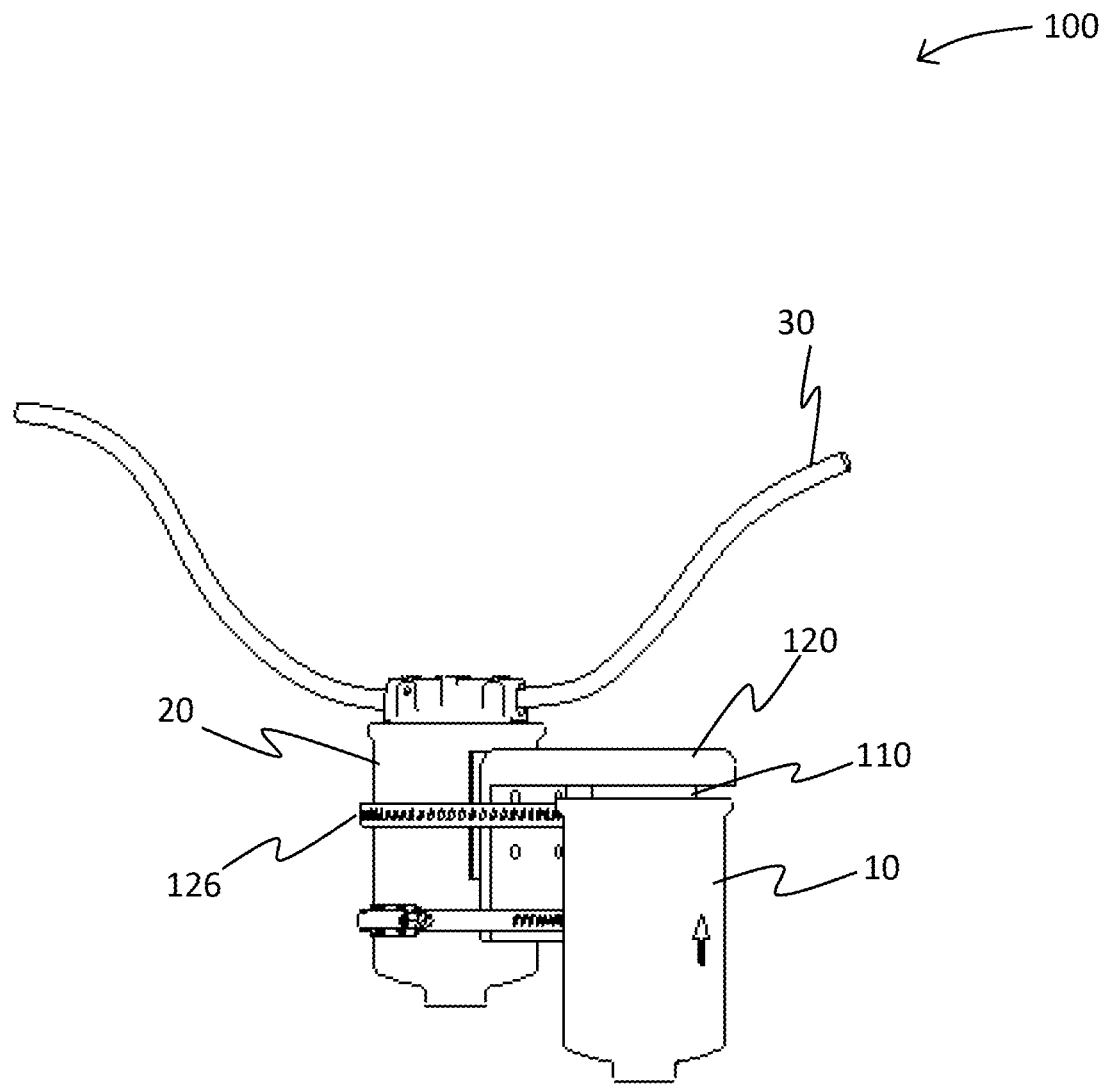
FIG. 2 is a side view of the device for storing the fuel filter in the vehicle, according to another embodiment of the present disclosure.

FIG. 2 shows the device for storing a fuel filter in a vehicle of FIG. 1, according to an embodiment of the present disclosure. As above, the device 100 may include the fuel filter couple 110 and the support frame 120. The support frame 120 may be configured to be fastened to an installed fuel filter 20 that is in use and installed in the vehicle and fluidly coupled to a fuel line 30. According to one exemplary embodiment, the support frame 120 may also include two adjustable hoop clamps 126 that are sized and dimensioned to circumscribe and tighten about the installed fuel filter 20.

Figure 3:
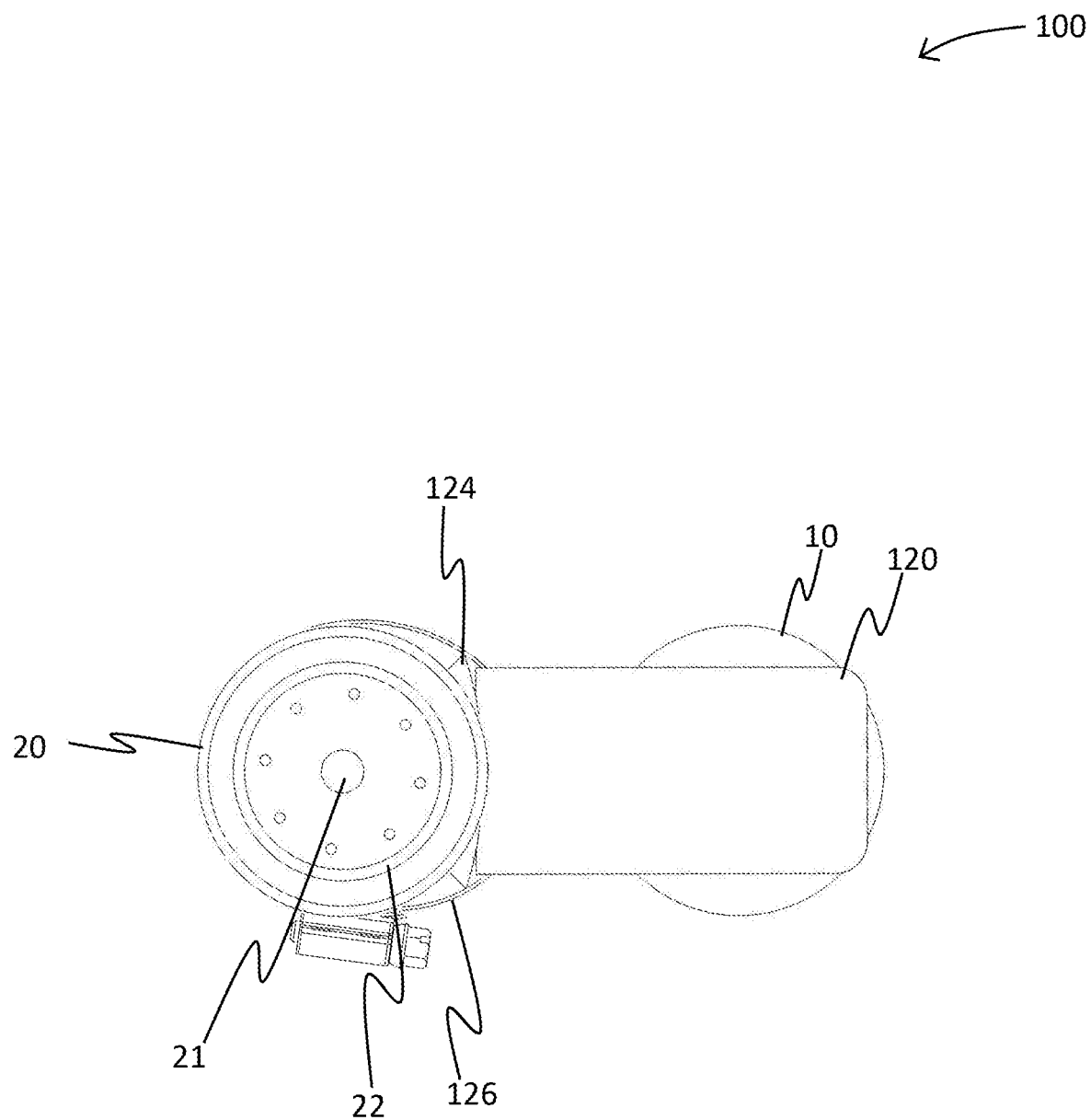
FIG. 3 is a top view of the device for storing the fuel filter in the vehicle of FIG. 2, according to an embodiment of the present disclosure.

FIG. 3 is a top view of the device for storing the fuel filter in the vehicle of FIG. 2. Here, for clarity and convenience, the installed fuel filter 20 is shown in isolation from its mount and fuel line 30. Further, the mounting pad 124 is shown affixed to a surface of the mounting bracket (normal to view) and facing the installed fuel filter 20, according to an embodiment of the present disclosure. The mounting pad 124 may be made of rubber or other material suitable to compressibly conform to the shape of the installed fuel filter 20.

Figure 4:
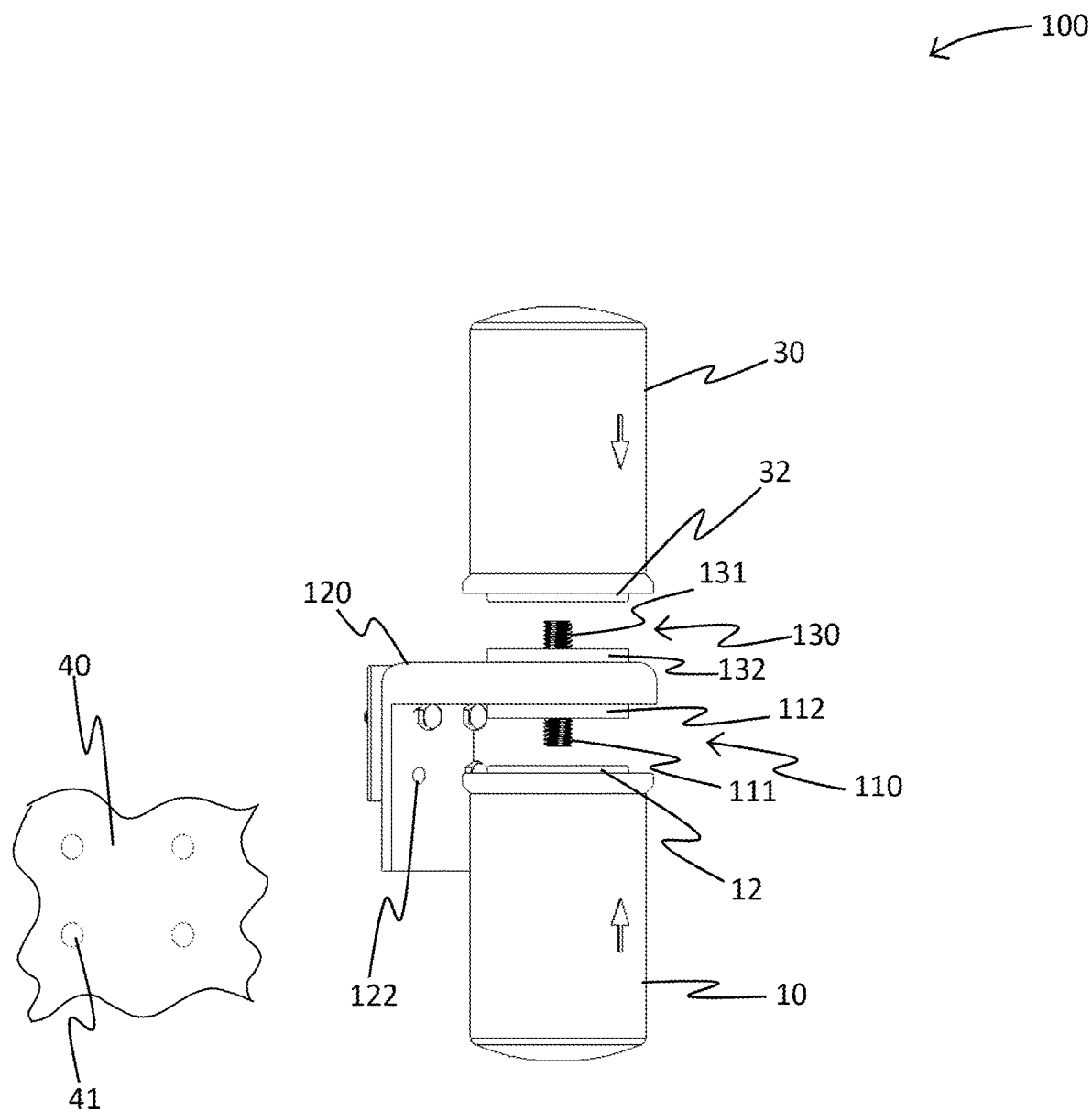
FIG. 4 is a side view of the device for storing the fuel filter in the vehicle, according to another embodiment of the present disclosure.

FIG. 4 is a side view of the device for storing the fuel filter in the vehicle of FIG. 1, according to an embodiment of the present disclosure. In this embodiment, the device 100 may be configured to store an extra fuel filter 30 in the vehicle. In particular, the device may include an opposing fuel filter couple 130. The opposing fuel filter couple 130 may include an opposing threaded male filter mount 131 and an opposing filter seal interface 132. The opposing threaded male filter mount 131 may threadably couple with a threaded female filter mount (not shown) of the extra fuel filter 30. The opposing filter seal interface 132 may be a pad made of rubber or other material suitable to create an airtight seal when the opposing threaded male filter mount 131 is tightened into the threaded female filter mount (not shown) of the extra fuel filter 30.

Figure 5:
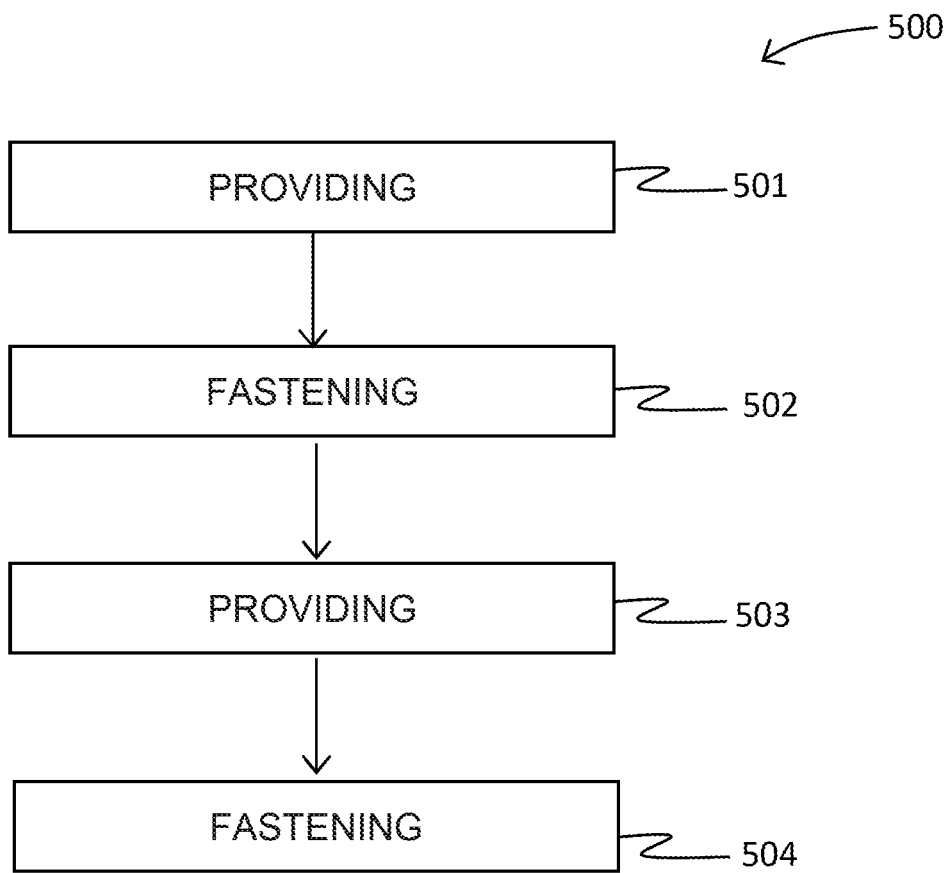
FIG. 5 is a flow diagram illustrating a method for storing a fuel filter in a vehicle, according to an embodiment of the present disclosure.

FIG. 5 is a flow diagram illustrating a method for storing a fuel filter in a vehicle, according to an embodiment of the present disclosure. In particular, the method 500 for storing a fuel filter in a vehicle may include one or more components or features of the device 100 for storing the fuel filter in the vehicle as described above. As illustrated, the method 500 for storing a fuel filter in a vehicle may include the steps of: step one 501, providing device for storing fuel filter in vehicle 100 (as described above); step two 502, fastening the fuel filter to the device 100 by threadably coupling the threaded female filter mount of the fuel filter with the threaded male filter mount of the device. The method 500 may further include the steps of: step three 503, providing at least one adjustable hoop clamp 126; and step four 504, fastening the device 100 to an installed fuel filter that is installed on the vehicle by circumscribing and tightening the at least one adjustable hoop clamp 126 about the installed fuel filter.

It should be noted that the steps described in the method of use can be carried out in different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for storing a fuel filter in a vehicle, are taught herein. Those with ordinary skill in the art will now appreciate that upon reading this specification and by their understanding the art of vehicles as described herein, methods of installation, use, maintenance, and structure will be understood by those knowledgeable in such art.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A device for storing a fuel filter in a vehicle, the fuel filter having a threaded female filter mount and a fuel filter seal, the device comprising:
   A fuel filter couple including a threaded male filter mount and a filter seal interface, the threaded male filter mount configured to threadably couple with the threaded female filter mount, and the filter seal interface configured to seal against the fuel filter seal when the threaded male filter mount is tightened into the threaded female filter mount; and
   A support frame extending from the fuel filter couple, and including a vehicle couple configured to mount the device to the vehicle wherein the vehicle couple is configured to be fastened to an installed fuel filter that is installed on the vehicle.

2. The device of claim 1, wherein the vehicle couple includes a mounting bracket configured to be fastened to at least one flat surface of the vehicle.

3. The device of claim 2, wherein the mounting bracket is further configured to be bolted to the at least one flat surface of the vehicle.

4. The device of claim 3, wherein the mounting bracket is further configured to include four bolt holes for each flat surface of the vehicle that said mounting bracket is to be bolted to.

5. The device of claim 3, wherein the mounting bracket is further configured to be bolted to the at least one flat surface of the vehicle using mounting bolts having a diameter of 5/16 inch or 3/8 inch.

6. The device of claim 2, wherein the fuel filter couple and the support frame are arranged such that an axis of coupling rotation between the threaded male filter mount and the threaded female filter mount is parallel to one of the at least one flat surface of the vehicle.

7. The device of claim 1, wherein the vehicle couple includes a mounting bracket having a curved surface that corresponds to a curvature of an interfacing portion of the installed fuel filter such that the curved surface of the mounting bracket mates with the interfacing portion of the installed fuel filter when fastened together.

8. The device of claim 1, wherein the vehicle couple includes at least one adjustable hoop clamp that is sized and dimensioned to circumscribe and tighten about the installed fuel filter.

9. The device of claim 1, wherein the vehicle couple includes a mounting bracket configured to be fastened to a cylindrical section of the installed fuel filter, and further includes a mounting pad affixed to a surface of the mounting bracket that faces the cylindrical section of the installed fuel filter when fastened to said installed fuel filter, said mounting pad configured to compressibly conform to a curvature of the cylindrical section of the installed fuel filter when the mounting bracket is fastened to the cylindrical section of the installed fuel filter.

10. The device of claim 9, wherein the surface of the mounting bracket that faces the cylindrical section of the installed fuel filter when fastened to said installed fuel filter has a concave shape oriented to align with the cylindrical section of the installed fuel filter.

11. The device of claim 10, wherein the concave shape of the surface of the mounting bracket that faces the cylindrical section of the installed fuel filter when fastened to said installed fuel filter has a concave radius of curvature greater than a corresponding convex radius of curvature of the cylindrical section of the installed fuel filter.

12. The device of claim 11, wherein the concave radius of curvature of the surface of the mounting bracket that faces the cylindrical section of the installed fuel filter when fastened to said installed fuel filter is at least three times greater than the corresponding convex radius of curvature of the cylindrical section of the installed fuel filter.

13. The device of claim 9, wherein the mounting pad is made of heat-resistant rubber.

14. The device of claim 1, further comprising an opposing fuel filter couple (130) for storing an extra fuel filter in the vehicle, the extra fuel filter having an extra threaded female filter mount and an extra fuel filter seal, the opposing fuel filter couple including an opposing threaded male filter mount and an opposing filter seal interface, the opposing threaded male filter mount configured to threadably couple with the opposing threaded female filter mount, and the opposing filter seal interface configured to seal against the extra fuel filter seal when the opposing threaded male filter mount is tightened into the extra threaded female filter mount.

15. The device of claim 1, wherein the support frame is made of heat-resistant metal.

16. A device for storing a fuel filter in a vehicle, the fuel filter having a threaded female filter mount and a fuel filter seal, the device comprising:
   a fuel filter couple including a threaded male filter mount and a filter seal interface, the threaded male filter mount configured to threadably couple with the threaded female filter mount, and the filter seal interface configured to seal against the fuel filter seal when the threaded male filter mount is tightened into the threaded female filter mount; and
   a support frame extending from the fuel filter couple, and including a vehicle couple configured to mount the device to the vehicle; and
   wherein the vehicle couple is configured to be fastened to an installed fuel filter that is installed on the vehicle;
   wherein the vehicle couple includes a mounting bracket having a curved surface that corresponds to a curvature of an interfacing portion of the installed fuel filter such that the curved surface of the mounting bracket mates with the interfacing portion of the installed fuel filter when fastened together;
   wherein the vehicle couple includes at least one adjustable hoop clamp that is sized and dimensioned to circumscribe and tighten about the installed fuel filter;
   wherein the vehicle couple includes a mounting bracket configured to be fastened to a cylindrical section of the installed fuel filter, and further includes a mounting pad affixed to a surface of the mounting bracket that faces the cylindrical section of the installed fuel filter when fastened to said installed fuel filter, said mounting pad configured to compressibly conform to a curvature of the cylindrical section of the installed fuel filter when the mounting bracket is fastened to the cylindrical section of the installed fuel filter;

wherein the surface of the mounting bracket that faces the cylindrical section of the installed fuel filter when fastened to said installed fuel filter has a concave shape oriented to align with the cylindrical section of the installed fuel filter;

wherein the concave shape of the surface of the mounting bracket that faces the cylindrical section of the installed fuel filter when fastened to said installed fuel filter has a concave radius of curvature greater than a corresponding convex radius of curvature of the cylindrical section of the installed fuel filter;

wherein the concave radius of curvature of the surface of the mounting bracket that faces the cylindrical section of the installed fuel filter when fastened to said installed fuel filter is at least three times greater than the corresponding convex radius of curvature of the cylindrical section of the installed fuel filter;

wherein the mounting pad is made of heat-resistant rubber; and wherein the support frame is made of heat-resistant metal.

17. The device of claim 16, further comprising set of instructions; and wherein the device is arranged as a kit.

18. A method of storing a fuel filter in a vehicle, the fuel filter having a threaded female filter mount and a fuel filter seal, the method comprising the steps of:

Providing a device for storing the fuel filter in the vehicle, the device including a fuel filter couple and a support frame, the fuel filter couple including a threaded male filter mount and a filter seal interface, the threaded male filter mount configured to threadably couple with the threaded female filter mount, and the filter seal interface configured to seal against the fuel filter seal when the threaded male filter mount is tightened into the threaded female filter mount, the support frame extending from the fuel filter couple, and including a vehicle couple configured to mount the device to the vehicle;

Providing at least one adjustable hoop clamp;

Fastening the device to an installed fuel filter that is installed on the vehicle by circumscribing and tightening the at least one hoop clamp about the installed fuel filter; and Fastening the fuel filter to the device by threadably coupling the threaded female filter mount of the fuel filter with the threaded male filter mount of the device.

* * * * *